US012589636B2

(12) United States Patent
Thorsell

(10) Patent No.: US 12,589,636 B2
(45) Date of Patent: Mar. 31, 2026

(54) AIR REGISTERS INCLUDING A ROTATABLE SHUTTER

(71) Applicant: Toyoda Gosei Co., Ltd., Kiyosu (JP)

(72) Inventor: Roy C. Thorsell, Troy, MI (US)

(73) Assignee: Toyoda Gosei Co., LTD., Kiyosu (JP)

( * ) Notice: Subject to any disclaimer, the term of this patent is extended or adjusted under 35 U.S.C. 154(b) by 431 days.

(21) Appl. No.: 18/299,796

(22) Filed: Apr. 13, 2023

(65) Prior Publication Data

US 2024/0343095 A1     Oct. 17, 2024

(51) Int. Cl.
B60H 1/34          (2006.01)
B60H 1/00          (2006.01)

(52) U.S. Cl.
CPC ....... B60H 1/3435 (2013.01); B60H 1/00857 (2013.01)

(58) Field of Classification Search
CPC ........................ B60H 1/00857; B60H 1/00871
See application file for complete search history.

(56) References Cited

U.S. PATENT DOCUMENTS

| | | | | |
|---|---|---|---|---|
| 10,160,293 | B2 * | 12/2018 | Brinas ................ | B60H 1/00564 |
| 11,225,126 | B2 * | 1/2022 | Lee ...................... | B60H 1/3421 |
| 11,358,441 | B2 * | 6/2022 | Morales .............. | B60H 1/3421 |
| 2018/0170149 | A1 * | 6/2018 | Fidh ..................... | B60H 1/3421 |
| 2018/0170153 | A1 * | 6/2018 | Lee ...................... | B60H 1/3421 |
| 2018/0334015 | A1 * | 11/2018 | Doll ..................... | B60H 1/345 |
| 2019/0092137 | A1 * | 3/2019 | Lee ...................... | B60H 1/3421 |
| 2022/0234425 | A1 * | 7/2022 | Wang .................... | B60K 35/10 |
| 2023/0001769 | A1 * | 1/2023 | Park ..................... | B60H 1/3421 |
| 2024/0351401 | A1 * | 10/2024 | Okuno ..................... | B60H 1/34 |

* cited by examiner

*Primary Examiner* — Ko-Wei Lin
(74) *Attorney, Agent, or Firm* — Dinsmore & Shohl LLP

(57)                 ABSTRACT

An air register including a blade member including a plurality of vertical blades and a side wall defining a rear opening, and a shutter rotatably coupled to the blade member, wherein rotation of the blade member in a rotation direction from a center state causes the shutter to rotate in the rotation direction and at least partially overlap the rear opening of the blade member, a rate of rotation of the shutter as the shutter rotates in the rotation direction is greater than a rate of rotation of the blade member as the blade member rotates in the rotation direction.

19 Claims, 12 Drawing Sheets

AIR REGISTERS INCLUDING A ROTATABLE SHUTTER

TECHNICAL FIELD

The present specification generally relates to air registers for vehicles and, more specifically, air registers having an adjustable shutter for inhibiting airflow.

BACKGROUND

Air registers in vehicles typically include a plurality of vertical vanes that are selectively adjustable to direct airflow in a plurality of directions in a width direction or lateral direction of the vehicle. For example, the vertical vanes may be oriented toward the left to direct airflow to the left and to the right to direct airflow to the right. However, as air flows through the air register, some of the air may contact a side wall of the air register and be redirected out of the air register. This redirected air affects a flow direction of the remaining air flowing through the air register such that the cumulative angle at which the air flows through the air register is not aligned with the selected orientation of the vertical air blades. Rather, the air flows more toward a center of the air register rather than the selected direction.

Accordingly, a need exists for improved air registers that provides more accurate airflow through the air registers and, thus, a greater range for which air may be directed out of the air registers.

SUMMARY

In one embodiment, an air register includes: a blade member including a plurality of vertical blades and a side wall defining a rear opening; and a shutter rotatably coupled to the blade member such that, when the air register is in an open position, air is permitted to enter the blade member through the rear opening and flow between the plurality of vertical blades, and when the air register is in a closed position, the shutter is rotated relative to the blade member to inhibit air from entering the blade member.

In another embodiment, a vehicle includes: a dashboard; and an air register provided within the dashboard, the air register including: a housing fixed to the dashboard; a blade member rotatably coupled to the housing, the blade member including a plurality of vertical blades and a side wall defining a rear opening; and a shutter rotatably coupled to the blade member such that, when the air register is in an open position, air is permitted to enter the blade member through the rear opening and flow between the plurality of vertical blades, and when the air register is in a closed position, the shutter is rotated relative to the blade member to inhibit air from entering the blade member through the rear opening.

In yet another embodiment, a method of operating an air register comprising a blade member including a plurality of vertical blades and a side wall defining a rear opening, and a shutter rotatably coupled to the blade member, the method including: rotating the blade member in a rotation direction from an open position in which the shutter permits air to enter the blade member through the rear opening and flow between the plurality of vertical blades; and automatically rotating, in response to the blade member rotating in the rotation direction from the open position to a closed position in which the shutter is rotated relative to the blade member to inhibit air from entering the blade member through the rear opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
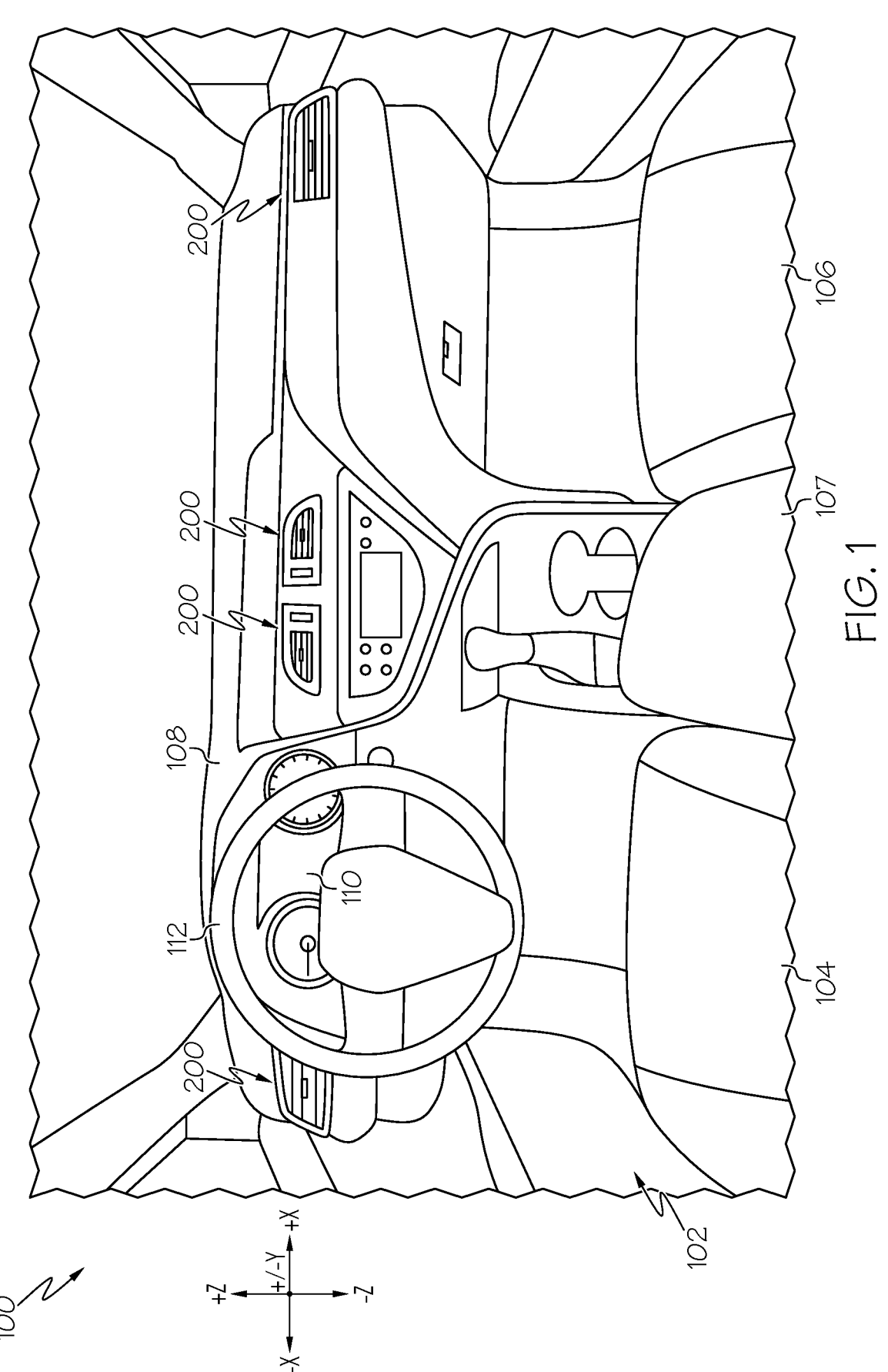
FIG. 1 schematically depicts a partial front view of an interior of a vehicle including a plurality of air registers, according to one or more embodiments shown and described herein.

Embodiments described herein are directed to air registers including a shutter for preventing air flowing through the air register to deviate from an intended flow direction based on an angular orientation of vertical blades of the air register. The air register includes a blade member including a plurality of vertical blades and a side wall defining a rear opening, and a shutter rotatably coupled to the blade member. In use, when the air register is in an open position, air is permitted to enter the blade member through the rear opening and flow between the plurality of vertical blades, and when the air register is in a closed position, the shutter is rotated relative to the blade member to inhibit air from entering the blade member.

Various embodiments of the air register and the operation of the air register are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. Specifically, "right" is defined as the positive X direction of the coordinate axes shown in the drawings, and "left" is defined as the negative X direction of the coordinate axes shown in the drawings. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a vehicle 100 is illustrated according to one or more embodiments described herein. The vehicle 100 includes an interior cabin 102 in which a driver seat 104 and a front passenger seat 106 are provided with a center console 107 provided therebetween. The vehicle 100 includes a dashboard 108 provided in front of the driver seat 104 and the front passenger seat 106. An instrument panel 110 is provided within the dashboard 108 and a steering wheel 112 is provided in front of the driver seat 104 extending in front of the instrument panel 110. As shown, the vehicle 100 includes a plurality of air registers 200 provided within the dashboard 108. However, it should be appreciated that the location of the air registers 200 is not limited to the specific location illustrated in FIG. 1. Rather, one or more air registers 200 may alternatively or additionally be provided at any other suitable location of the vehicle 100 such as, for example, in a rear passenger compartment of the vehicle 100 located behind the driver seat 104 and the front passenger seat 106, on a side door of the vehicle 100, on the rear of the center console 107, and the like.

As shown in FIG. 1, the vehicle 100 is provided as an automobile which includes coupes, sedans, minivans, trucks, crossovers, hybrids, and sports utility vehicles. However, the air register 200 is not limited to automobiles. In embodiments, the air register 200 may be provided in any vehicle such as a watercraft, aircraft, or the like.

Figure 2:
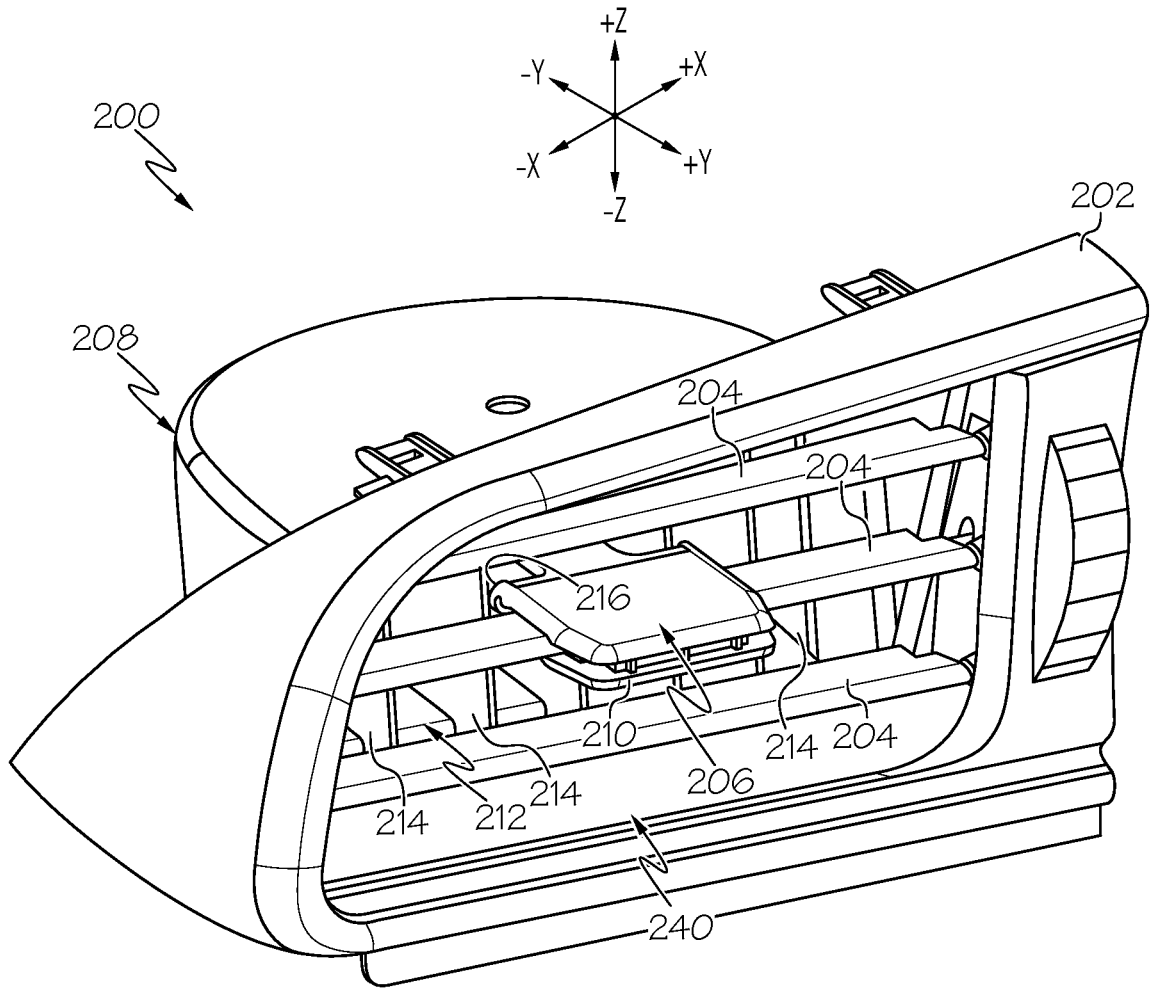
FIG. 2 schematically depicts a perspective view of the air register, according to one or more embodiments shown and described herein.

Referring now to FIG. 2, one of the air registers 200 of the vehicle 100 of FIG. 1 is shown separate from the vehicle 100. The air register 200 generally includes a frame 202, a plurality of horizontal fins 204 provided within the frame 202, a push knob 206 slidably mounted on one of the horizontal fins 204 within the frame 202, and a housing 208 provided rearwardly of the frame 202. In embodiments, the frame 202 may be fixed to the housing 208. In other embodiments, the frame 202 and the housing 208 may be individually fixed or coupled to the dashboard 108 of the vehicle 100 of FIG. 1.

Referring still to FIG. 2, the horizontal fins 204 are elongated planar members extending from opposite sides of a front opening 240 of the housing 208. The horizontal fins 204 control the flow of air flowing through the housing 208 in the vehicle vertical direction. The horizontal fins 204 are interconnected such that pivoting of one of the horizontal fins 204 results in pivoting of each of the horizontal fins 204. It should be appreciated that the horizontal fins 204 may be pivoted by operating the push knob 206 to orient a distal end 210 of the push knob 206 upward or downward in the vehicle vertical direction.

As described in more detail herein, the air register 200 further includes a blade member 212 provided within the housing 208 including a plurality of vertical blades 214. As described in more detail herein, the push knob 206 is coupled to one of the vertical blades 214 such that movement of the push knob 206 in the vehicle lateral direction along one of the horizontal fins 204 causes the blade member 212 to rotate in a corresponding direction relative to the housing 208. In addition, it should be appreciated that a proximal end 216 of the push knob 206 opposite the distal end 210 is free to move in the vehicle vertical direction relative to the vertical blades 214 such that the horizontal fins 204 may be pivoted by positioning the push knob 206 without being restricted by the push knob 206 being coupled to the vertical blades 214.

Figure 3:
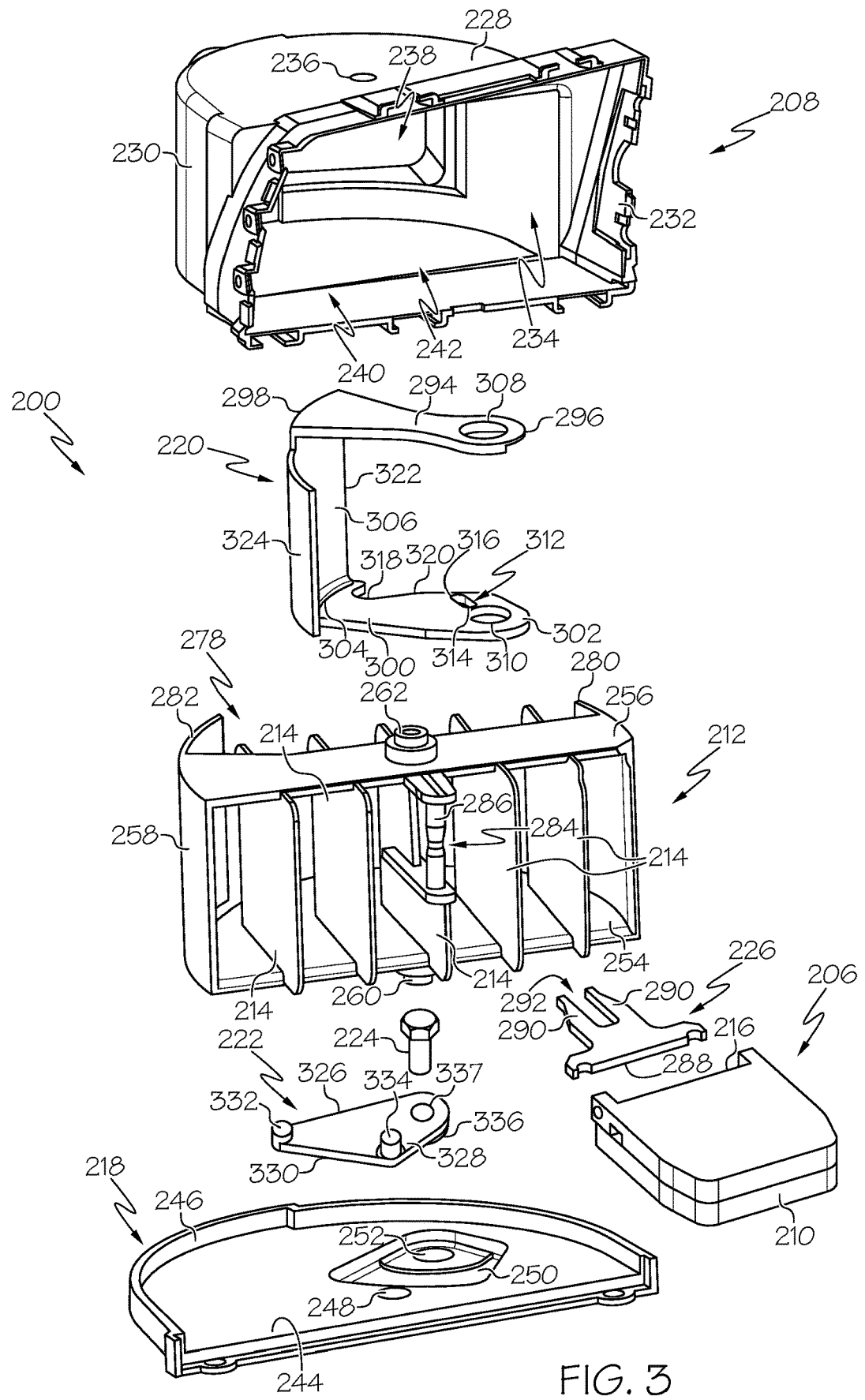
FIG. 3 schematically depicts an exploded perspective view of the air register, according to one or more embodiments shown and described herein.

Referring now to FIG. 3, an exploded view of the air register 200 is illustrated. As shown, the air register 200 generally includes the housing 208, the blade member 212, and the push knob 206. The air register 200 further, includes a bottom plate 218, a shutter 220, a cam member 222, a cam screw 224, and a fork 226.

The housing 208 includes an upper wall 228, a side wall 230 extending from the upper wall 228, and a front wall 232 formed at the upper wall 228 and the side wall 230. The upper wall 228 and the side wall 230 define an open interior 234 in which the blade member 212 and the shutter 220 are positioned. The upper wall 228 has an upper aperture 236 formed therein for rotatably coupling the housing 208 to the blade member 212, as described in more detail herein. In embodiments, the side wall 230 is a substantially semicircular member. A rear opening 238 is formed in the side wall 230 opposite the front wall 232. A front opening 240 is formed in the front wall 232 such that a flow path may be formed for air to flow through the housing 208, specifically, through the rear opening 238 of the side wall 230 into the housing 208 and through the front opening 240 of the front wall 232 out of the housing 208. The side wall 230 and the front wall 232 cooperate to define a bottom opening 242 formed in the housing 208.

The bottom plate 218 includes a lower wall 244 and a rim 246 extending from the lower wall 244. The lower wall 244 has a lower aperture 248 formed therein for rotatably coupling the housing 208 to the blade member 212, as described in more detail herein. As shown, a recess 250 is formed in the lower wall 244 adjacent the lower aperture 248 and a cam hole 252 is formed therein. In embodiments, the cam hole 252 extends entirely through the lower wall 244. In other embodiments, the cam hole 252 extends only partially through the lower wall 244 of the bottom plate 218. The bottom plate 218 is fixed to the housing 208 such as, for example, to the front wall 232 of the housing 208, to fix the bottom plate 218 to the housing 208 and cover the bottom opening 242 formed in the housing 208.

Figure 4:
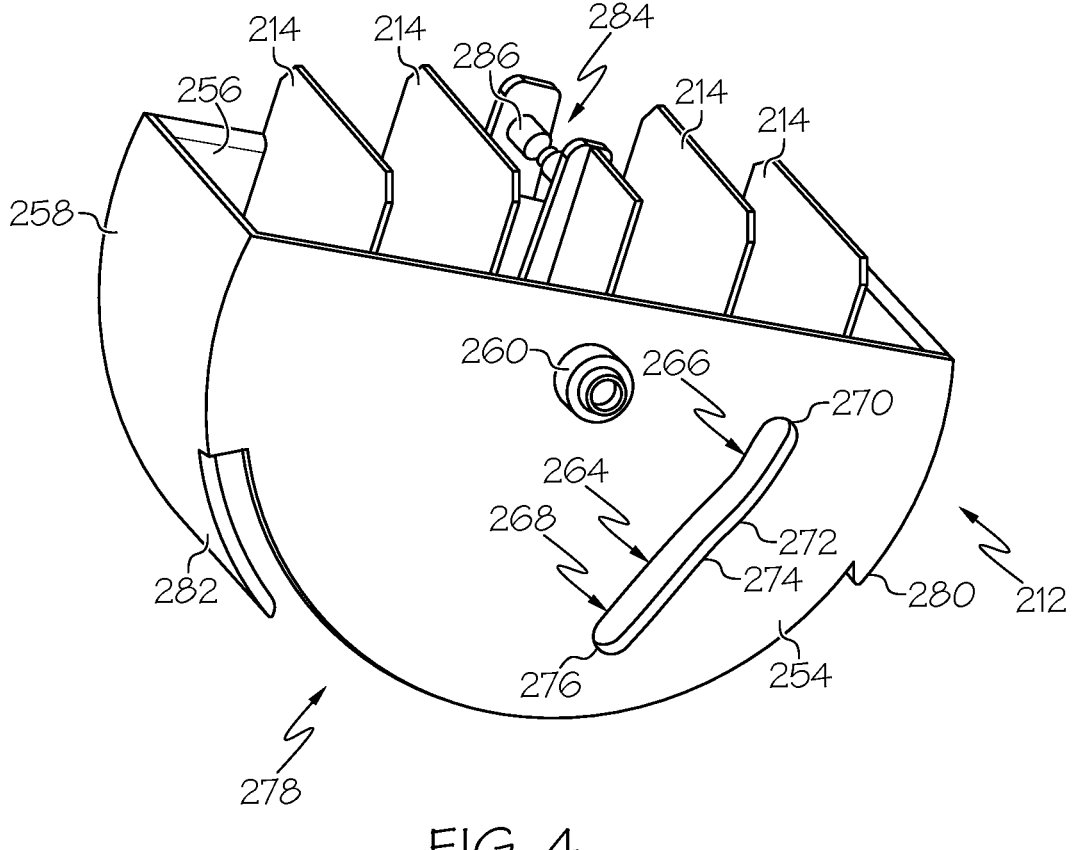
FIG. 4 schematically depicts a bottom perspective view of a blade member of the air register, according to one or more embodiments shown and described herein.

Referring to FIGS. 3 and 4, the blade member 212 includes a bottom wall 254, a top wall 256 opposite the bottom wall 254, and a side wall 258 extending between the bottom wall 254 and the top wall 256. A bottom pivot boss 260 is formed on the bottom wall 254 and extends in a direction opposite the top wall 256, and a top pivot boss 262 is formed on the top wall 256 and extends in a direction opposite the bottom wall 254. As described in more detail herein, the bottom pivot boss 260 engages the lower aperture 248 formed in the bottom plate 218, and the top pivot boss 262 engages the upper aperture 236 formed in the housing 208. Thus, the blade member 212 is rotatably coupled to the housing 208 and the bottom plate 218. Additionally, a blade cam slot 264 is formed in the bottom wall 254 of the blade member 212. The blade cam slot 264 defines an arcuate blade cam slot portion 266 and a linear blade cam slot portion 268 extending from the arcuate blade cam slot portion 266. The arcuate blade cam slot portion 266 has a first end 270 and a second end 272 opposite the first end 270. The linear blade cam slot portion 268 has a first end 274 at the second end 272 of the arcuate blade cam slot portion 266, and a second end 276 opposite the first end 274 of the linear blade cam slot portion 268. It should be appreciated that the arcuate blade cam slot portion 266 defines an angle corresponding to a rotation path of the blade member 212. The arcuate blade cam slot portion 266 is formed proximate the vertical blades 214, and the linear blade cam slot portion 268 extends from the second end 272 of the arcuate blade cam slot portion 266 in a direction opposite the vertical blades 214.

The side wall 258 of the blade member 212 defines a rear opening 278 allowing air to enter the blade member 212 and pass between the vertical blades 214. Additionally, the side wall 258 defines a first side wall portion 280 provided on one side of the rear opening 278 and a second side wall portion 282 provided on an opposite side of the rear opening 278. As discussed in more detail herein, the first side wall portion 280 and the second side wall portion 282 facilitate blocking a portion of the air flowing through the housing 208 and the blade member 212.

As shown, the blade member 212 includes the vertical blades 214 extending between the bottom wall 254 and the top wall 256. Although the blade member 212 is illustrated as including five vertical blades 214, it should be appreciated that the blade member 212 may include any number of vertical blades 214 such as, for example, one, two, three, four, or more than five vertical blades 214. As shown, one of the vertical blades 214 has a cutout 284 formed therein and a fork column 286 extends within the cutout 284.

Referring again to FIG. 3, the fork 226 includes a fork body 288 and a pair of fingers 290 extending from the fork body 288. A gap 292 is formed between the pair of fingers 290 for engaging the fork column 286 formed in one of the vertical blades 214 of the blade member 212. The fork 226 is insertable into the proximal end 216 of the push knob 206 to engage the push knob 206 and rotatably couple the push knob 206 to one of the vertical blades 214. In embodiments, the fork 226 may engage the push knob 206 by being snap fit or any suitable engaging member such as, for example, a clasp, fastener, pin, and the like, may be utilized.

The shutter 220 includes an upper arm 294 having a first end 296 and a second end 298 opposite the first end 296, a lower arm 300 having a first end 302 and a second end 304 opposite the first end 302, and a blocking wall 306 extending between the second end 298 of the upper arm 294 and the second end 304 of the lower arm 300. The upper arm 294 has an upper shutter aperture 308 formed therein, through which the top pivot boss 262 of the blade member 212 extends, and the lower arm 300 has a lower shutter aperture 310 formed therein, through which the bottom pivot boss 260 of the blade member 212 extends. Thus, the shutter 220 is rotatably attached to the blade member 212 and rotatably coupled to the housing 208 and the bottom plate 218. A shutter cam slot 312 is formed in the lower arm 300 proximate the lower shutter aperture 310 and extends in a radial direction relative to the lower shutter aperture 310. The shutter cam slot 312 has a first end 314 proximate the bottom pivot boss 260 and a second end 316 opposite the first end 314. Additionally, in embodiments, an indentation 318 is formed within a side edge 320 of the lower arm 300 of the shutter 220. The blocking wall 306 has a leading edge 322 and includes an extension portion 324 opposite the leading edge 322 that does not overlap the upper arm 294 and the lower arm 300 in a plan view. The blocking wall 306 has an arcuate shape corresponding to the shape of the side wall 230 of the housing 208 and the extension portion 324 extends in a direction opposite the indentation 318 formed in the lower arm 300.

The cam member 222 includes a cam body 326 having an upper surface 328 and a lower surface 330 opposite the upper surface 328. As shown, the cam body 326 has a substantially triangular shape. However, it should be appreciated that the cam body 326 may have any suitable shape such as, for example, circular, rectangular, and the like. The cam member 222 includes a first cam pin 332 and a second cam pin 334 extending from the upper surface 328, and a third cam pin 336 extending from the lower surface 330 in a direction opposite the first cam pin 332 and the second cam pin 334. A throughbore 337 extends between the upper surface 328 and the lower surface 330 of the cam body 326, and the throughbore 337 extends coaxial with the third cam pin 336. As described in more detail herein, the first cam pin 332 is received within the shutter cam slot 312 formed in the lower arm 300 of the shutter 220. The second cam pin 334 is received within the blade cam slot 264. The third cam pin 336 is received within the cam hole 252 formed in the bottom plate 218. The cam screw 224 shown in FIG. 3 extends through the throughbore 337 and the cam hole 252 to rotatably secure the cam member 222 to the bottom plate 218. Accordingly, the cam member 222 is rotatably fixed to the bottom plate 218 about the third cam pin 336. Additionally, as described in more detail herein, the first cam pin 332 and the second cam pin 334 are movably positioned within the shutter cam slot 312 and the blade cam slot 264, respectively, to facilitate movement of the shutter 220 relative to the blade member 212 as the blade member 212 rotates within the housing 208.

Although it is described herein that the cam member 222 is provided below the blade member 212 in the vehicle vertical direction such that the cam member 222 is provided between the blade member 212 and the bottom plate 218, it should be appreciated that the cam member 222 may be located above the blade member 212. In such embodiments, the shutter cam slot 312, which engages the first cam pin 332, may be formed in the upper arm 294 of the shutter 220, and the blade cam slot 264, which engages the second cam pin 334, may be formed in top wall 256 of the blade member 212. Additionally, in such embodiments, the cam hole 252, which engages the third cam pin 336 of the cam member 222, may be formed in the upper wall 228 of the housing 208 rather than the bottom plate 218 so as to maintain rotation of the cam member 222 relative to the housing 208 as opposed to the bottom plate 218.

Referring now to FIG. 5A-5C, the air register 200 is shown in a center state and an open position. Specifically, as shown in FIG. 5A, air is depicted by arrows F as flowing through the rear opening 238 formed in the housing 208, through the open interior 234 of the housing 208, between the vertical blades 214 of the blade member 212, and out of the housing 208 through the front opening 240 of the housing 208. In the center state, the push knob 206 is located at a substantially central position in the vehicle lateral direction relative to the housing 208 to orient the vertical blades 214 in a straight on direction, i.e., substantially parallel to the vehicle longitudinal direction. As shown in FIG. 5A, the first side wall portion 280 and the second side wall portion 282 of the blade member 212 do not overlap or extend across the rear opening 238 formed in the housing 208. Accordingly, the first side wall portion 280 and the second side wall portion 282 do not inhibit the flow of air through the housing 208 and the blade member 212.

As shown in FIG. 5B, a bottom view of the air register 200 in the center state is depicted with components hidden by the bottom plate 218 shown in phantom to illustrate the position of the blade member 212, the cam member 222, and the shutter 220 relative to one another and the housing 208. As such, FIG. 5B indicates a position of the shutter 220 relative to the blade member 212 when in the center state and, more specifically, the position of the first cam pin 332 and the second cam pin 334 within the shutter cam slot 312 and the blade cam slot 264, respectively. Specifically, in the center state, the first cam pin 332 is located at the second end 316 of the shutter cam slot 312 furthest from the bottom pivot boss 260, and the second cam pin 334 is positioned within the arcuate blade cam slot portion 266, particularly at the second end 272 of the arcuate blade cam slot portion 266. It should be appreciated that when the second cam pin 334 is located within the arcuate blade cam slot portion 266, the shutter 220 does not rotate relative to the housing 208 as the blade member 212 is rotated via the push knob 206. Alternatively, as discussed in more detail herein, when the second cam pin 334 is moved out of the arcuate blade cam slot portion 266 and located within the linear blade cam slot portion 268, the shutter 220 rotates in the same direction as the blade member 212, but at a rate faster than the blade member 212. In other words, when the second cam pin 334 is in the arcuate blade cam slot portion 266, the position of the shutter 220 is fixed relative to the housing 208, and when the second cam pin 334 is in the linear blade cam slot portion 268, the shutter 220 rotates at a rate greater than the blade member 212 in the same direction as the blade member 212. As used herein, it should be appreciated that reference to a rate of rotation of the blade member 212 or the shutter 220 is dependent on a distance traveled in a rotation direction in response to movement of the push knob 206.

As shown in FIG. 5C, a front view of the blade member 212 coupled to the shutter 220 and the cam member 222 separate from the housing 208 when the air register 200 is in the center state is depicted. In other words, FIG. 5C depicts a position of the shutter 220 relative to the blade member 212, not the housing 208. As best shown in FIGS. 5B and 5C, a distance D1 indicates a distance between the leading edge 322 of the shutter 220 and a distal location of the side wall 258 of the blade member 212. Accordingly, the shutter 220 is shown to overlap the vertical blades 214 of the blade member 212 by the distance D1 when the air register 200 is in the center state.

Referring now to FIGS. 6A-6C, the air register 200 is shown in a right-most state and partially open position. Specifically, as shown in FIG. 6A, air is depicted by arrows F as flowing through the rear opening 238 formed in the housing 208, through the open interior 234 of the housing 208, between the vertical blades 214 of the blade member 212, and out of the housing 208 through the front opening 240 of the housing 208. In the right-most state, the push knob 206 is moved in the direction of arrow A1 in the vehicle lateral direction relative to the housing 208 to rotate the blade member 212 in a counter-rotation direction B1 about the bottom pivot boss 260 to orient the vertical blades 214 at a first angle θ1, i.e., directed toward a right side of the vehicle 100 (FIG. 1) from a top plan view, relative to an axis extending parallel to the moving direction of the push knob 206. It should be appreciated that the air register 200 is positionable between a plurality of right-intermediate states between the center state and the right-most state.

As shown in FIG. 6A, the first side wall portion 280 of the blade member 212 partially overlaps and extends across the rear opening 238 formed in the housing 208 such that a portion of the air entering the housing 208 is inhibited from flowing through the blade member 212 and out of the front opening 240 of the housing 208. It should be appreciated that without the first side wall portion 280, air entering the housing 208 and the blade member 212 would contact the side wall 230 of the housing 208 and redirect the contacting air, which would impede the direction of the remaining air flowing through the blade member 212. Accordingly, the first side wall portion 280 ensures that air flows between the vertical blades 214 and out of the housing 208 without contacting the side wall 230 of the housing 208. Thus, the angle at which air exits the housing 208 is greater than if the first side wall portion 280 was not provided.

As shown in FIG. 6B, a bottom view of the air register 200 in the right-most state is depicted with components hidden by the bottom plate 218 shown in phantom to illustrate the position of the blade member 212, the cam member 222, and the shutter 220 relative to one another and the housing 208. As such, FIG. 6B indicates a position of the shutter 220 relative to the blade member 212 when in the right-most state and, more specifically, the position of the first cam pin 332 and the second cam pin 334 within the shutter cam slot 312 and the blade cam slot 264, respectively. Specifically, in the right-most state, the first cam pin 332 is located at the second end 316 of the shutter cam slot 312 furthest from the bottom pivot boss 260, similar to that noted above when in the center state, and the second cam pin 334 is positioned within the arcuate blade cam slot portion 266, particularly at the first end 270 of the arcuate blade cam slot portion 266.

As the push knob 206 moves in the direction of arrow A1 from the substantially central position (FIG. 5B), the second cam pin 334 moves in the direction of arrow E1 from the second end 272 of the arcuate blade cam slot portion 266 toward the first end 270 of the arcuate blade cam slot portion 266. Particularly, as shown in FIG. 6B, in the right-most state, the second cam pin 334 is located at the first end 270 of the arcuate blade cam slot portion 266. Accordingly, when comparing a position of the shutter 220 relative to the housing 208 illustrated in FIG. 5B and a position of the shutter 220 relative to the housing 208 illustrated in FIG. 6B, it is apparent that the shutter 220 has not moved. As such, it should be appreciated that as the air register 200 is operated between the center state (FIG. 5A) and the right-most state (FIG. 6A) by pushing the push knob 206 in the direction of A1 and the blade member 212 rotates accordingly, the second cam pin 334 of the cam member 222 moves within only the arcuate blade cam slot portion 266 to maintain the position of the shutter 220 relative to the housing 208.

As shown in FIG. 6C, a front view of the blade member 212 coupled to the shutter 220 and the cam member 222 separate from the housing 208 when the air register 200 is in the right-most state is depicted. In other words, FIG. 6C depicts a position of the shutter 220 relative to the blade member 212, not the housing 208. As best shown in FIGS. 6B and 6C, a distance D2 indicates a distance between the leading edge 322 of the shutter 220 and the distal location of the side wall 258 of the blade member 212. Accordingly, the shutter 220 is shown to overlap the vertical blades 214 of the blade member 212 by the distance D2 when the air register 200 is in the right-most state. As the shutter 220 does not rotate as the air register 200 moves between the center state and the right-most state, the distance D2 shown in FIGS. 6B and 6C when the air register 200 is in the right-most state is greater than the distance D1 shown in FIGS. 5B and 5C when the air register 200 is in the center state. Accordingly, the shutter 220 is shown in the same position in FIG. 5B when the air register 200 is in the center state compared to the position of the shutter 220 in FIG. 6B when the air register 200 is in the right-most state.

Figure 6A:
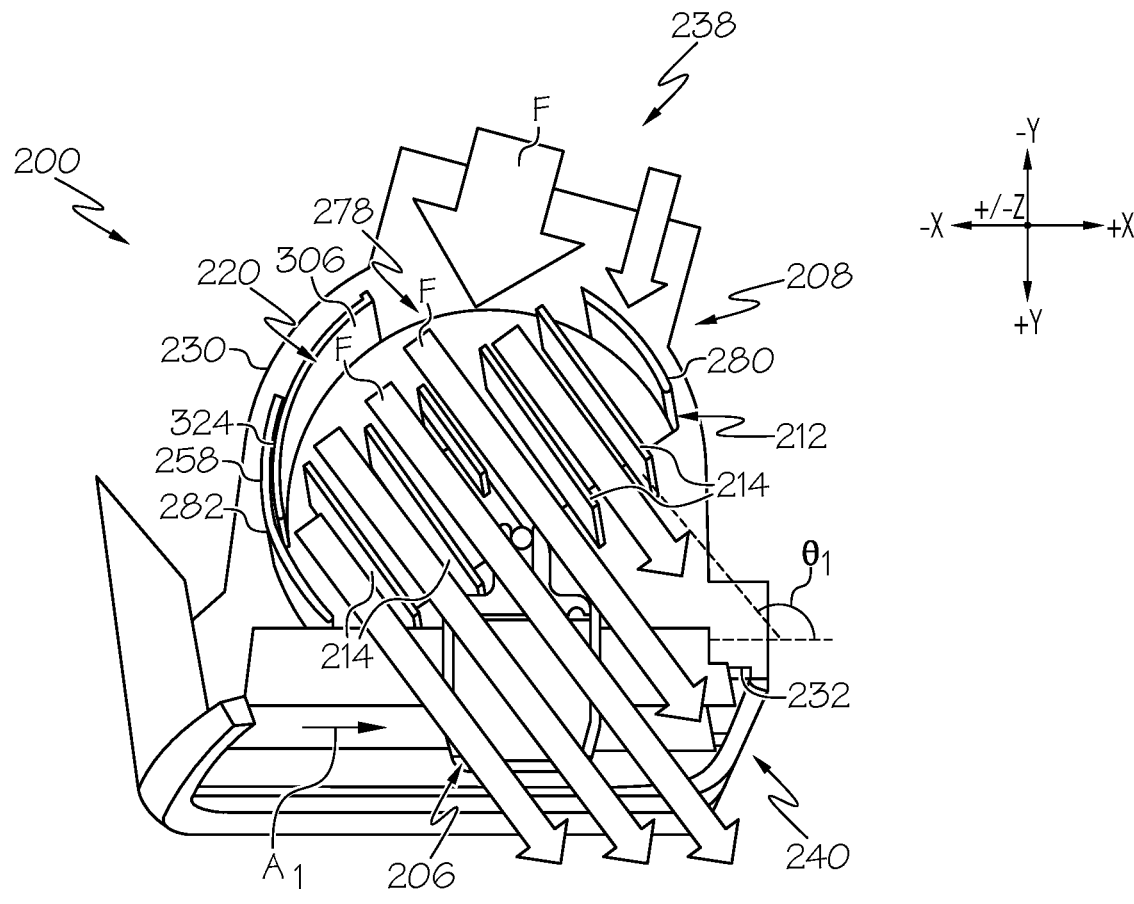
FIG. 6A schematically depicts a partial top view of the air register in a right-most state and a partially open position, according to one or more embodiments shown and described herein.
Figures 7A, 7B:
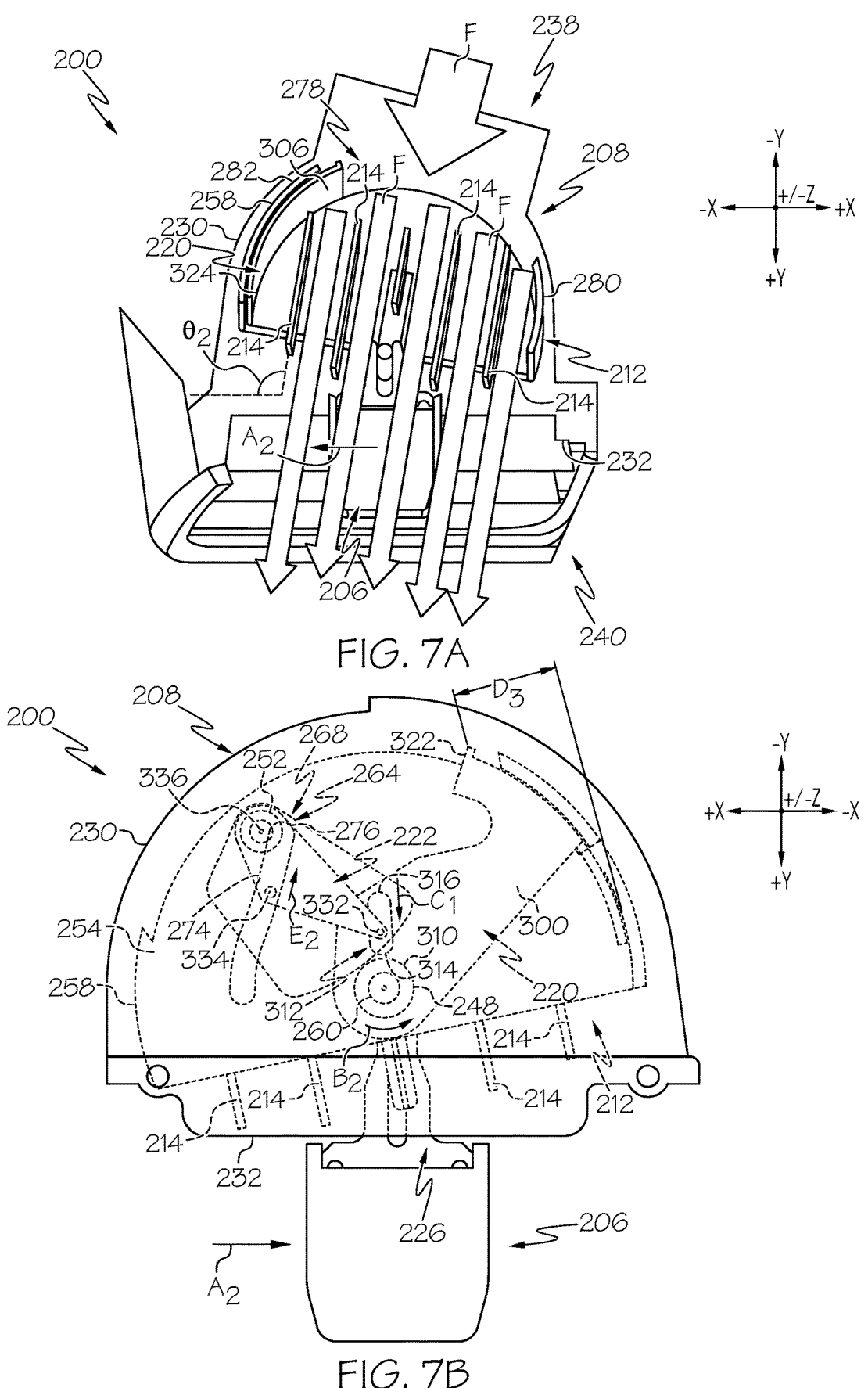
FIG. 7A schematically depicts a partial top view of the air register in a first left-intermediate state and a partially open position, according to one or more embodiments shown and described herein.
FIG. 7B schematically depicts a bottom view of the air register in the first left-intermediate state and the partially open position, according to one or more embodiments shown and described herein.

As shown in FIG. 7A, as the push knob 206 is moved in the direction of arrow A2 opposite the direction of arrow A1 (FIG. 6A), the blade member 212 is rotated in a rotation direction B2, opposite the counter-rotation direction B1 (FIG. 6A). Accordingly, the air register 200 is positionable into a left-most state (FIGS. 9A-9C) and a plurality of left-intermediate states such as, for example, a first left-intermediate state (FIGS. 7A-7C) and a second left-intermediate state (FIGS. 8A-8C). However, it should be appreciated that the air register 200 is positionable between any number of left-intermediate states other than those specifically discussed herein such as only a single left-intermediate state or more than two left-intermediate states. Additionally, it should be appreciated that when the air register 200 is in the left-most state, the air register 200 is in a closed position such that the shutter 220 is rotated relative to the blade member 212 to inhibit air from entering the blade member 212. Similarly, when the air register 200 is in any of the plurality of left-intermediate states such as, for example, a first left-intermediate state (FIGS. 7A-7C) and a second left-intermediate state (FIGS. 8A-8C), the air register 200 is in a partially open position such that that the shutter 220 is rotated relative to the blade member 212 to only partially inhibit air from entering the blade member 212.

Figure 7C:
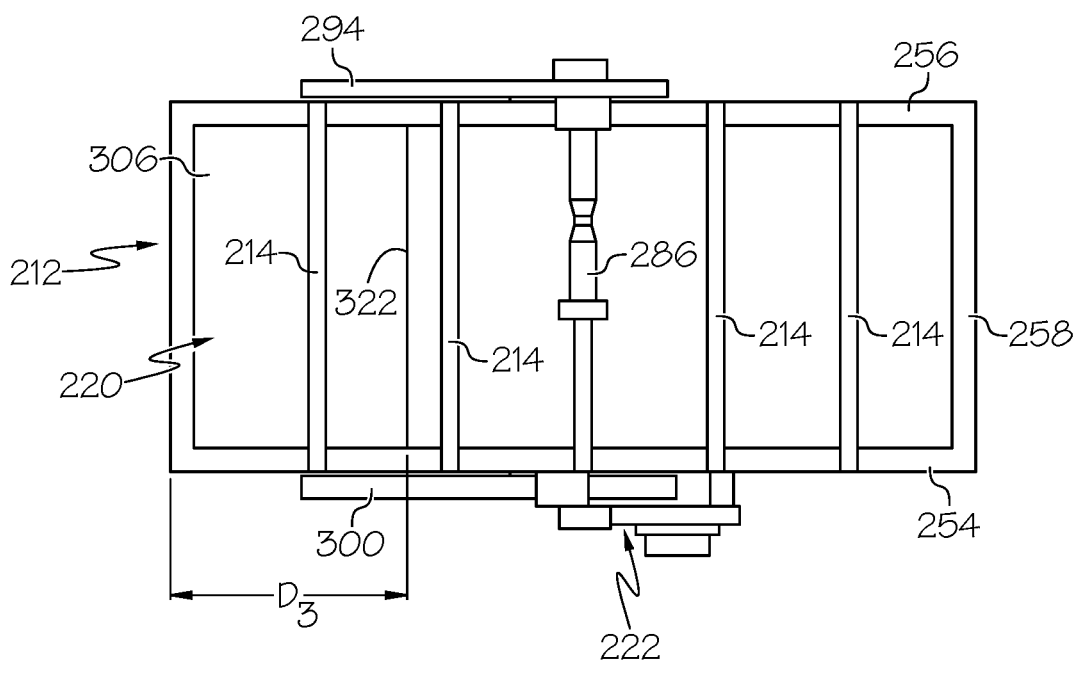
FIG. 7C schematically depicts a front view of the blade member and the shutter of the air register in the first left-intermediate state and the partially open position, according to one or more embodiments shown and described herein.
Figure 8A:
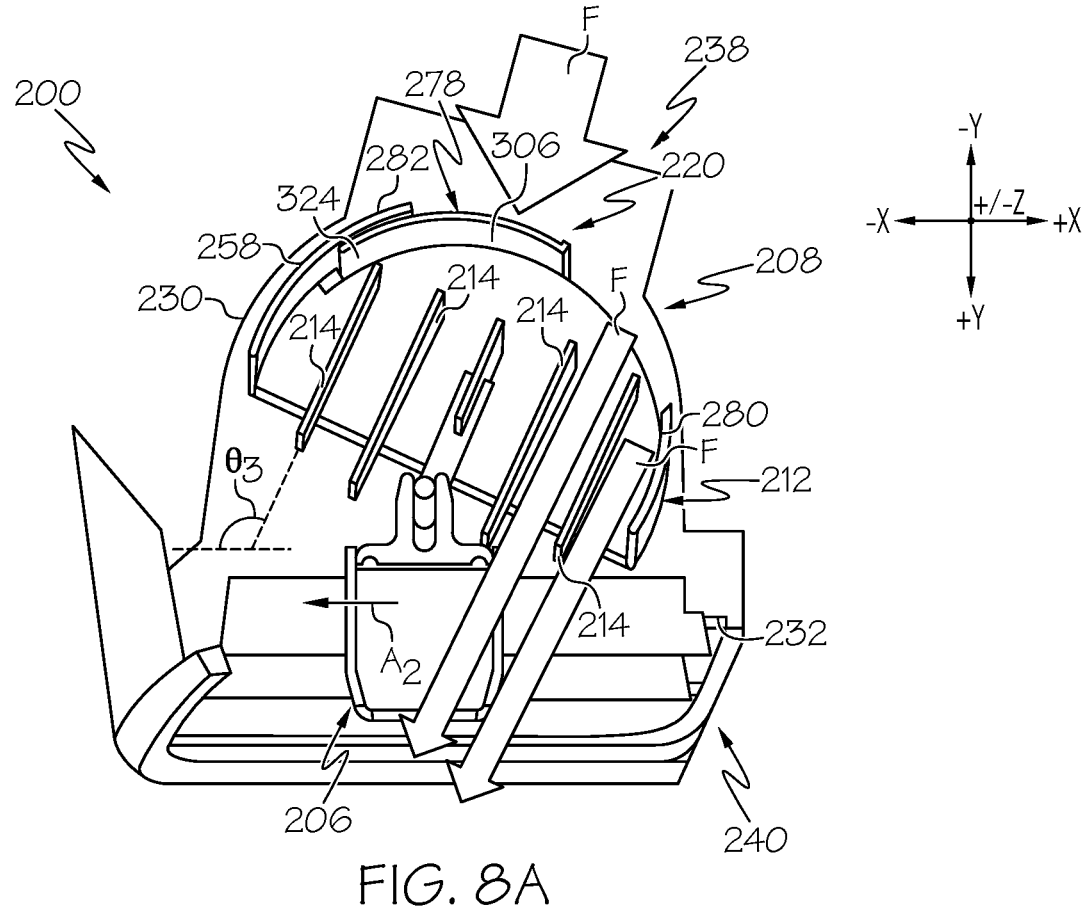
FIG. 8A schematically depicts a partial top view of the air register in a second left-intermediate state and a partially open position, according to one or more embodiments shown and described herein.
Figures 8B, 8C:
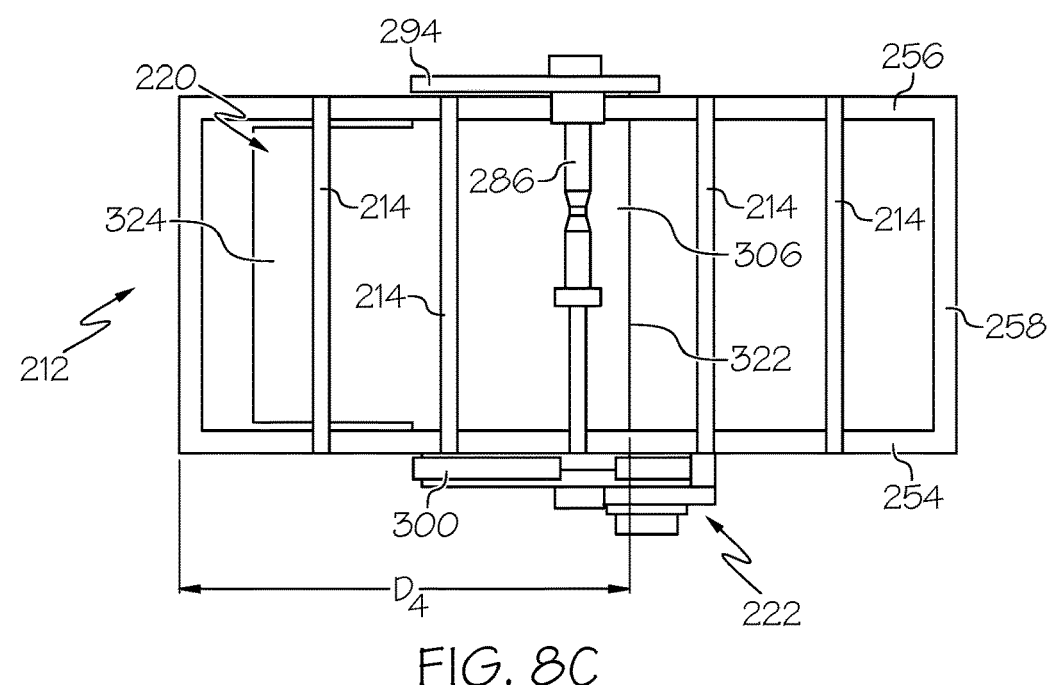
FIG. 8B schematically depicts a bottom view of the air register in the second left-intermediate state and the partially open position, according to one or more embodiments shown and described herein.
FIG. 8C schematically depicts a front view of the blade member and the shutter of the air register in the second left-intermediate state and the partially open position, according to one or more embodiments shown and described herein.

Referring now to FIGS. 7A-7C, the air register 200 is shown in the first left-intermediate state. Specifically, as shown in FIG. 7A, air is depicted by arrows F as flowing through the rear opening 238 formed in the housing 208, through the open interior 234 of the housing 208, between the vertical blades 214 of the blade member 212, and out of the housing 208 through the front opening 240 of the housing 208. In the first left-intermediate state, the push knob 206 is moved in the direction of arrow A2 in the vehicle lateral direction relative to the housing 208 to rotate the blade member 212 in the rotation direction B2 about the bottom pivot boss 260 to orient the vertical blades 214 at a second angle θ2, i.e., directed toward a left side of the vehicle 100 (FIG. 1) from a top plan view, relative to the axis extending parallel to the moving direction of the push knob 206.

As shown in FIG. 7A, the blocking wall 306 of the shutter 220 partially overlaps and extends across the rear opening 238 formed in the housing 208 such that a portion of the air entering the housing 208 is inhibited from flowing through the blade member 212 and out of the front opening 240 of the housing 208. As described herein with respect to the second side wall portion 282 of the blade member 212, without the blocking wall 306 of the shutter 220 overlapping the rear opening 238 of the housing 208, air entering the housing 208 and the blade member 212 would contact the side wall 230 of the housing 208 and redirect the contacting air, which would impede the direction of the remaining air flowing through the blade member 212. Accordingly, the blocking wall 306 of the shutter 220 ensures that air flows between the vertical blades 214 and out of the housing 208 without contacting the side wall 230 of the housing 208. Thus, the angle at which air exits the housing 208 is greater than if the shutter 220 was not provided. As described in more detail herein, the amount of overlap by the shutter 220 over the rear opening 238 increases as the air register 200 moves toward the left-most state, e.g., by moving the push knob 206 in the direction of arrow A2 and rotating the blade member 212 in the rotation direction B2, which similarly and automatically rotates the shutter 220 in the rotation direction B2.

As shown in FIG. 7B, a bottom view of the air register 200 in the first left-intermediate state is depicted with components hidden by the bottom plate 218 shown in phantom to illustrate the position of the blade member 212, the cam member 222, and the shutter 220 relative to one another and the housing 208. As such, FIG. 7B indicates a position of the shutter 220 relative to the blade member 212 when in the first left-intermediate state and, more specifically, the position of the first cam pin 332 and the second cam pin 334 within the shutter cam slot 312 and the blade cam slot 264, respectively.

Figures 5A, 5B:
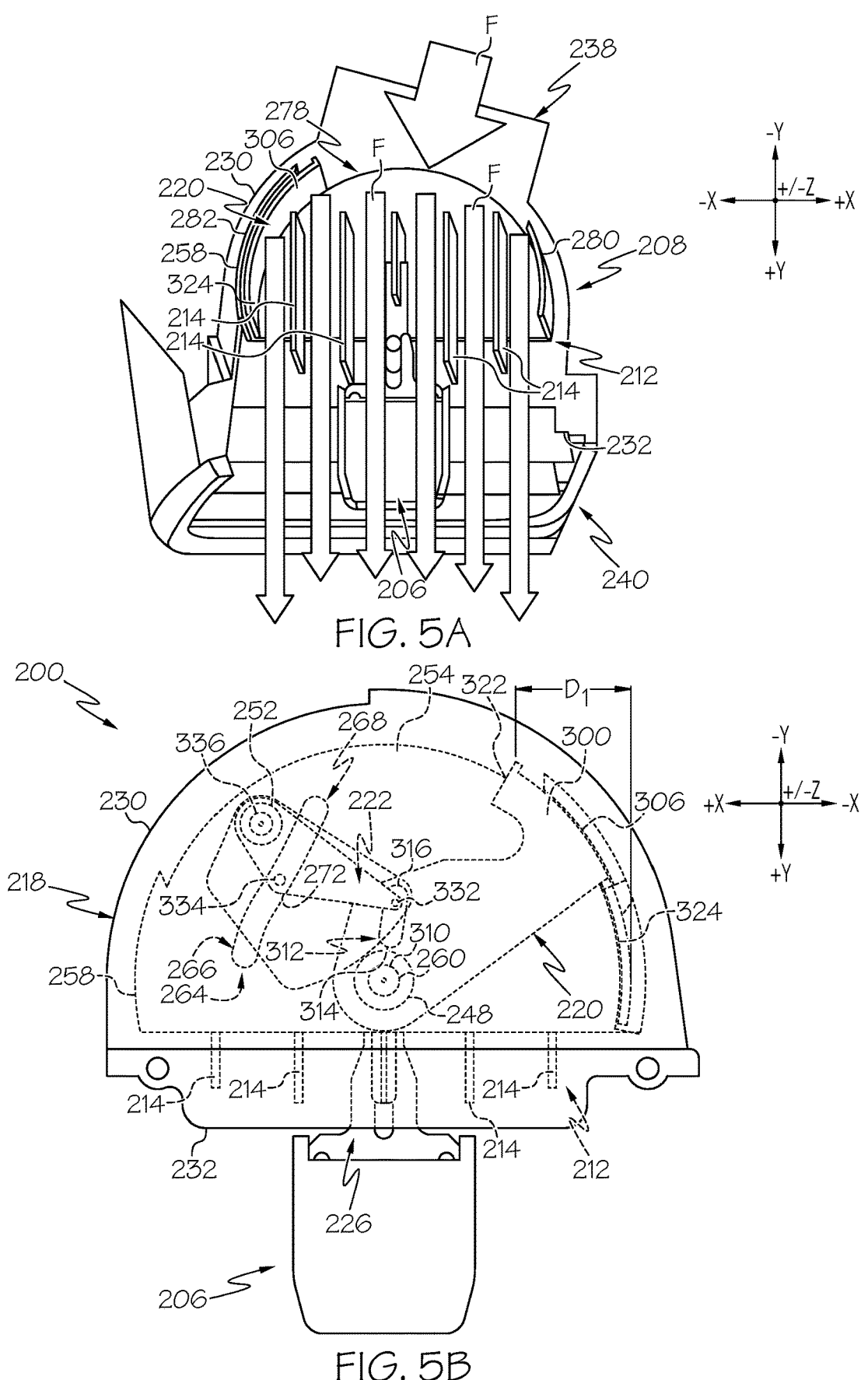
FIG. 5A schematically depicts a partial top view of the air register in a center state and an open position, according to one or more embodiments shown and described herein.
FIG. 5B schematically depicts a bottom view of the air register in the center state and the open position, according to one or more embodiments shown and described herein.
Figure 5C:
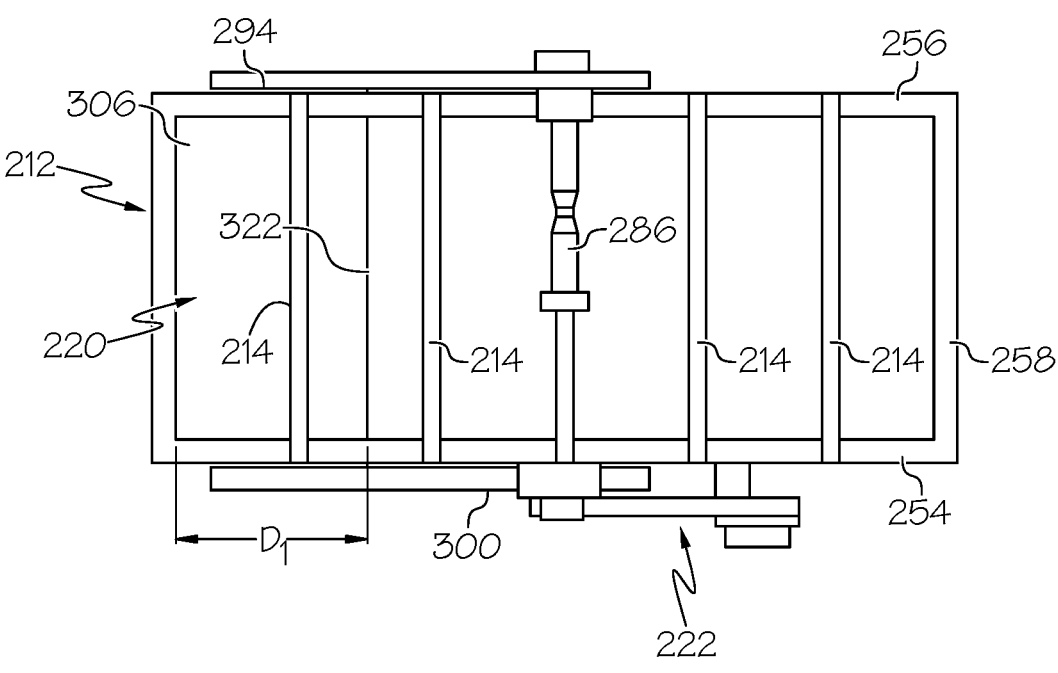
FIG. 5C schematically depicts a front view of the blade member and a shutter of the air register in the center state and the open position, according to one or more embodiments shown and described herein.
Figures 6B, 6C:
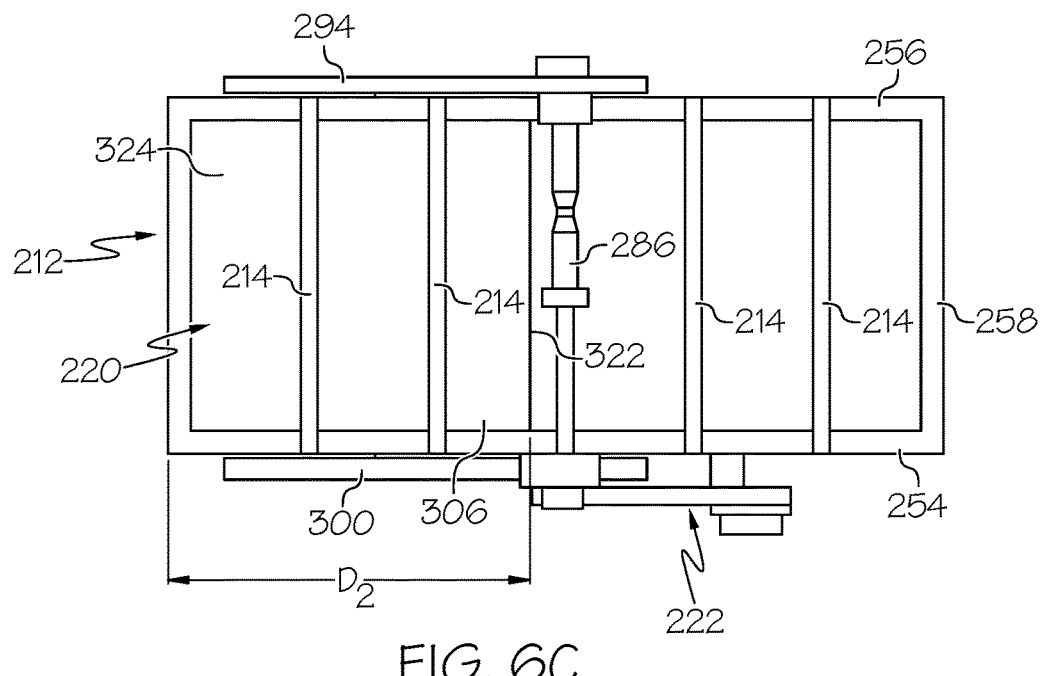
FIG. 6B schematically depicts a bottom view of the air register in the right-most state and the partially open position, according to one or more embodiments shown and described herein.
FIG. 6C schematically depicts a front view of the blade member and the shutter of the air register in the right-most state the partially open position, according to one or more embodiments shown and described herein.

As the push knob 206 moves in the direction of arrow A2 from the substantially central position illustrated in FIG. 5B to move the air register 200 out of the center state and toward the left-most state (FIG. 9B), the cam member 222 is driven to rotate about the third cam pin 336. This causes the first cam pin 332 to move in the direction of arrow C1 from the second end 316 of the shutter cam slot 312 toward the first end 314 of the shutter cam slot 312, which drives the motion of the shutter 220. Accordingly, as shown in FIG. 7B with the air register 200 in the first left-intermediate state, the first cam pin 332 is located closer to the first end 314 of the shutter cam slot 312 than the position of the first cam pin 332 when the air register 200 is in the center state (FIG. 5B).

Additionally, as the push knob 206 moves in the direction of arrow A2 from the substantially central position (FIG. 5B), the second cam pin 334 is positioned within the linear blade cam slot portion 268 and moves in the direction of arrow E2 from the first end 274 of the linear blade cam slot portion 268 toward the second end 276 of the linear blade cam slot portion 268. Particularly, as shown in FIG. 7B, in the first left-intermediate state, the second cam pin 334 is located at the first end 274 of the linear blade cam slot portion 268. With the second cam pin 334 positioned within the linear blade cam slot portion 268, the shutter 220 rotates at a rate greater than a rate at which the blade member 212 rotates. Thus, it should be appreciated that the relative movement between the second cam pin 334 within the linear blade cam slot portion 268 and the blade member 212 causes the cam member 222 to rotate and thus drive the shutter 220.

As shown in FIG. 7C, a front view of the blade member 212 coupled to the shutter 220 and the cam member 222 separate from the housing 208 when the air register 200 is in the first left-intermediate state is depicted. In other words, FIG. 7C depicts a position of the shutter 220 relative to the blade member 212, not the housing 208. As best shown in FIGS. 7B and 7C, a distance D3 indicates a distance between the leading edge 322 of the shutter 220 and the distal location of the side wall 258 of the blade member 212. Accordingly, the shutter 220 is shown to overlap the vertical blades 214 of the blade member 212 by the distance D3 when the air register 200 is in the first left-intermediate state. As described herein, with the second cam pin 334 positioned within the linear blade cam slot portion 268, the rate of rotation of the shutter 220 is greater than the rate of rotation of the blade member 212. Accordingly, the distance D3 when the air register 200 is in the first left-intermediate state is greater than the distance D1 shown in FIG. 5C when the air register 200 is in the center state.

Referring now to FIGS. 8A-8C, the air register 200 is shown in the second left-intermediate state. In the second left-intermediate state, the push knob 206 is moved in the direction of arrow A2 in the vehicle lateral direction relative to the housing 208 to rotate the blade member 212 in the rotation direction B2 about the bottom pivot boss 260 to orient the vertical blades 214 at a third angle θ3, i.e., directed toward a left side of the vehicle 100 (FIG. 1) from a top plan view, relative to the axis extending parallel to the moving direction of the push knob 206. It should be appreciated that the third angle θ3 is greater than the second angle θ2 depicted in FIG. 7A when the air register 200 is in the first left-intermediate state.

As shown in FIG. 8A, the blocking wall 306 and the extension portion 324 of the shutter 220 partially overlap and extend across the rear opening 238 formed in the housing 208 such that a portion of the air entering the housing 208 is inhibited from flowing through the blade member 212 and out of the front opening 240 of the housing 208. As shown in FIG. 8A and described in more detail herein, the amount of overlap by the shutter 220 over the rear opening 238 when the air register 200 is in the second left-intermediate state is greater than the amount of overlap by the shutter 220 when the air register 200 is in the first left-intermediate state.

As shown in FIG. 8B, a bottom view of the air register 200 in the second left-intermediate state is depicted with components hidden by the bottom plate 218 shown in phantom to illustrate the position of the blade member 212, the cam member 222, and the shutter 220 relative to one another and the housing 208. As such, FIG. 8B indicates a position of the shutter 220 relative to the blade member 212 when in the second left-intermediate state and, more specifically, the position of the first cam pin 332 and the second cam pin 334 within the shutter cam slot 312 and the blade cam slot 264, respectively.

As described herein, as the push knob 206 moves in the direction of arrow A2 from the substantially central position illustrated in FIG. 5B to move the air register 200 out of the center state and toward the left-most state (FIG. 9B), the cam member 222 is driven to rotate about the third cam pin 336. This causes the first cam pin 332 to move in the direction of arrow C1 from the second end 316 of the shutter cam slot 312 toward the first end 314 of the shutter cam slot 312, which drives the motion of the shutter 220. Accordingly, as shown in FIG. 8B with the air register 200 in the second left-intermediate state, the first cam pin 332 is located closer to the first end 314 of the shutter cam slot 312 than the position of the first cam pin 332 when the air register 200 is in the center state (FIG. 5B) and the first left-intermediate state (FIG. 7B).

Additionally, as discussed herein, as the push knob 206 moves in the direction of arrow A2 from the substantially central position (FIG. 5B), the second cam pin 334 is positioned within the linear blade cam slot portion 268 and moves in the direction of arrow E2 from the first end 274 of the linear blade cam slot portion 268 toward the second end 276 of the linear blade cam slot portion 268. Particularly, as shown in FIG. 8B, in the second left-intermediate state, the second cam pin 334 is located closer to the second end 276 of the linear blade cam slot portion 268 than the position of the second cam pin 334 when the air register 200 is in the first left-intermediate state (FIG. 7B). Accordingly, as described herein, movement between the second cam pin 334 within the linear blade cam slot portion 268 and the blade member 212 causes the cam member 222 to rotate and thus drive the shutter 220.

As shown in FIG. 8C, a front view of the blade member 212 coupled to the shutter 220 and the cam member 222 separate from the housing 208 when the air register 200 is in the second left-intermediate state is depicted. In other words, FIG. 8C depicts a position of the shutter 220 relative to the blade member 212, not the housing 208. As best shown in FIGS. 8B and 8C, a distance D4 indicates a distance between the leading edge 322 of the shutter 220 and the distal location of the side wall 258 of the blade member 212. Accordingly, the shutter 220 is shown to overlap the vertical blades 214 of the blade member 212 by the distance D4 when the air register 200 is in the second left-intermediate state. As described herein, with the second cam pin 334 positioned within the linear blade cam slot portion 268, the rate of rotation of the shutter 220 is greater than the rate of rotation of the blade member 212. Accordingly, the distance D4 when the air register 200 is in the second left-intermediate state is greater than the distance D3 shown in FIG. 7C when the air register 200 is in the first left-intermediate state.

Figures 9A, 9B:
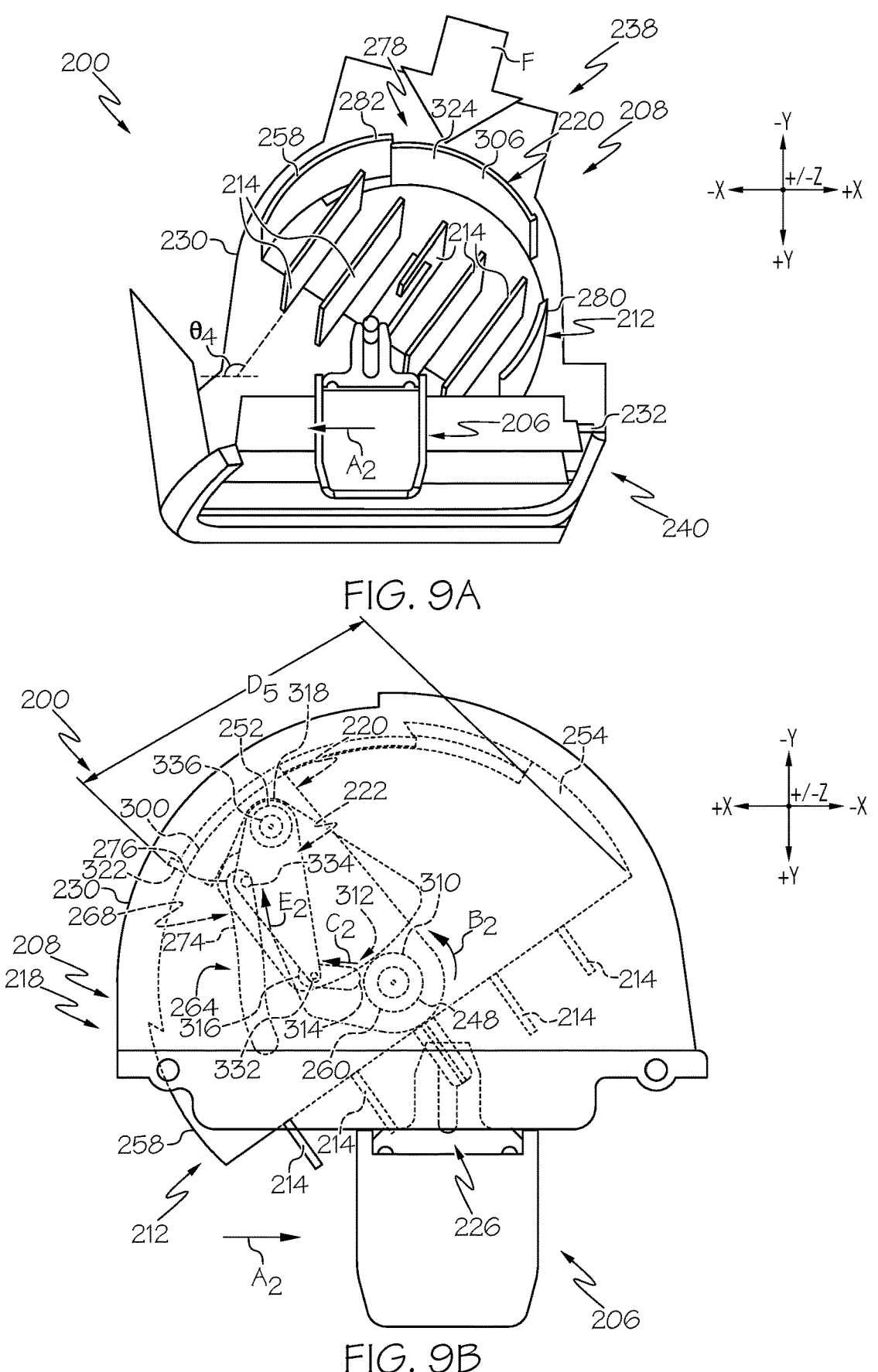
FIG. 9A schematically depicts a partial top view of the air register in a left-most state and a closed position, according to one or more embodiments shown and described herein.
FIG. 9B schematically depicts a bottom view of the air register in the left-most state and the closed position, according to one or more embodiments shown and described herein.
Figure 9C:
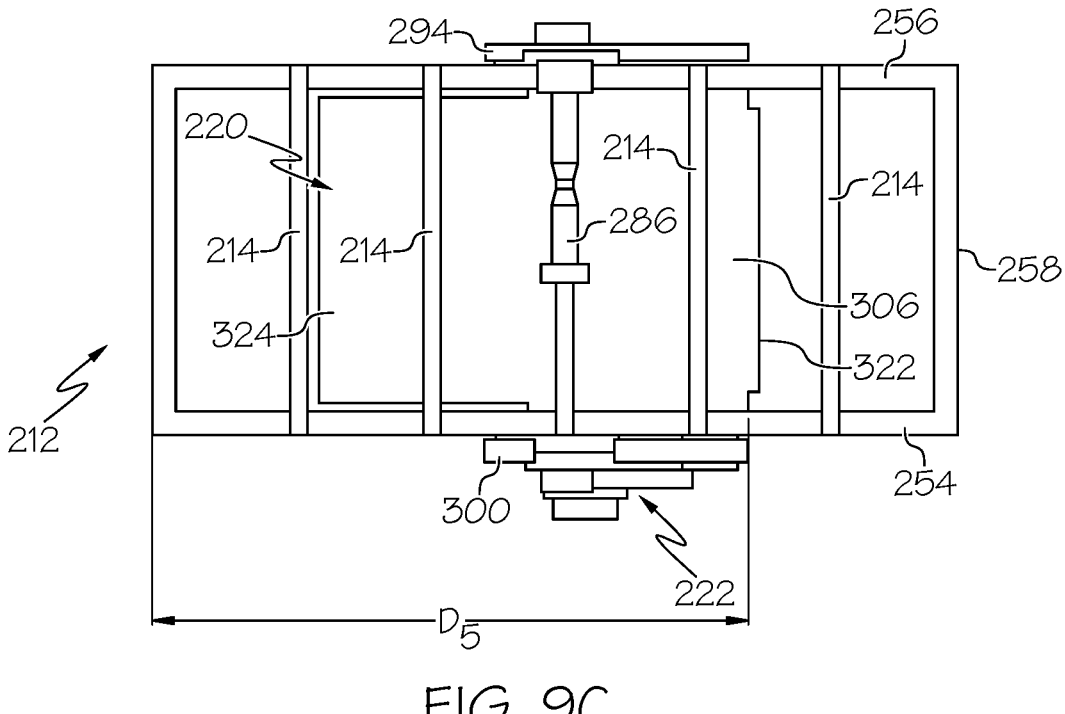
FIG. 9C schematically depicts a front view of the blade member and the shutter of the air register in the left-most state and the closed position, according to one or more embodiments shown and described herein.

Referring now to FIGS. 9A-9C, the air register 200 is shown in the left-most state. In the left-most state, the push knob 206 is moved in the direction of arrow A2 in the vehicle lateral direction relative to the housing 208 to rotate the blade member 212 in the rotation direction B2 about the bottom pivot boss 260 to orient the vertical blades 214 at a fourth angle θ4, i.e., directed toward a left side of the vehicle 100 (FIG. 1) from a top plan view, relative to the axis extending parallel to the moving direction of the push knob 206. It should be appreciated that the fourth angle θ4 is greater than the third angle θ3 depicted in FIG. 8A when the air register 200 is in the second left-intermediate state.

As shown in FIG. 9A, the blocking wall 306 and the extension portion 324 of the shutter 220 completely overlap and extend across the rear opening 238 formed in the housing 208 to inhibit air from entering the housing 208 from and flowing through the blade member 212 and out of the front opening 240 of the housing 208. As shown in FIG. 9A and described in more detail herein, the amount of overlap by the shutter 220 over the rear opening 238 when the air register 200 is in the left-most state is greater than the amount of overlap by the shutter 220 when the air register 200 is in the second left-intermediate state.

As shown in FIG. 9B, a bottom view of the air register 200 in the left-most state is depicted with components hidden by the blade member 218 shown in phantom to illustrate the position of the blade member 212, the cam member 222, and the shutter 220 relative to one another and the housing 208. As such, FIG. 9B indicates a position of the shutter 220 relative to the blade member 212 when in the left-most state and, more specifically, the position of the first cam pin 332 and the second cam pin 334 within the shutter cam slot 312 and the blade cam slot 264, respectively.

As the push knob 206 moves in the direction of arrow A2 from the substantially central position illustrated in FIG. 5B to move the air register 200 out of the center state and toward the left-most state, the first cam pin 332 moves in the direction of arrow C2, from the first end 314 of the shutter cam slot 312 toward the second end 316 of the shutter cam slot 312. As shown in FIGS. 8B and 9B, the direction of arrow C1 is opposite the direction of arrow C2 relative to a longitudinal axis of the shutter cam slot 312. Accordingly, as shown in FIG. 9B with the air register 200 in the left-most state, the first cam pin 332 is located closer to the second end 316 of the shutter cam slot 312 than the position of the first cam pin 332 when the air register 200 is in the first left-intermediate state (FIG. 7B) and the second left-intermediate state (FIG. 8B).

Additionally, as discussed herein, as the push knob 206 moves in the direction of arrow A2 from the substantially central position (FIG. 5B), the second cam pin 334 is positioned within the linear blade cam slot portion 268 and moves in the direction of arrow E2 from the first end 274 of the linear blade cam slot portion 268 toward the second end 276 of the linear blade cam slot portion 268. Particularly, as shown in FIG. 9B, in the left-most state, the second cam pin 334 is located closer to the second end 276 of the linear blade cam slot portion 268 than the position of the second cam pin 334 when the air register 200 is in the second left-intermediate state (FIG. 7B). As shown in FIG. 9B, the indentation 318 formed in the lower arm 300 of the shutter 220 allows for rotation of the shutter 220 without being inhibited by the lower arm 300 of the shutter 220 contacting the third cam pin 336.

As shown in FIG. 9C, a front view of the blade member 212 coupled to the shutter 220 and the cam member 222 separate from the housing 208 when the air register 200 is in the left-most state is depicted. In other words, FIG. 9C depicts a position of the shutter 220 relative to the blade member 212, not the housing 208. As best shown in FIGS. 9B and 9C, a distance D5 indicates a distance between the leading edge 322 of the shutter 220 and the distal location of the side wall 258 of the blade member 212. Accordingly, the shutter 220 is shown to overlap the vertical blades 214 of the blade member 212 by the distance D5 when the air register 200 is in the left-most state. As described herein, with the second cam pin 334 positioned within the linear blade cam slot portion 268, the rate of rotation of the shutter 220 is greater than the rate of rotation of the blade member 212.

Accordingly, the distance D5 when the air register 200 is in the left-most state is greater than the distance D4 shown in FIG. 8C when the air register 200 is in the second left-intermediate state.

Although operation of the air register 200 is described herein as moving from the center state to the right-most state, or moving from the center state to the left-most state, it should be appreciated that operation of the air register 200 returning to the center state from either the right-most state or the left-most state is achieved by moving the push knob 206 in an opposite direction, which results in the above movements of the individual components moving in a reverse direction.

From the above, it is to be appreciated that defined herein is an air register including a blade member including a plurality of vertical blades and a side wall defining a rear opening, and a shutter rotatably coupled to the blade member. In use, when the air register is in an open position, air is permitted to enter the blade member through the rear opening and flow between the plurality of vertical blades, and when the air register is in a closed position, the shutter is rotated relative to the blade member to inhibit air from entering the blade member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An air register comprising:
   a blade member including a plurality of vertical blades and a side wall defining a rear opening;
   a shutter rotatably coupled to the blade member such that, when the air register is in an open position, air is permitted to enter the blade member through the rear opening and flow between the plurality of vertical blades, and when the air register is in a closed position, the shutter is rotated relative to the blade member to inhibit air from entering the blade member; and
   a housing defining an open interior, the blade member provided within the open interior of the housing and rotatably coupled to the housing.

2. The air register of claim 1, further comprising:
   a push knob; and
   a fork rotatably coupling the push knob to one of the plurality of vertical blades of the blade member.

3. The air register of claim 1, further comprising:
   a cam member including a first cam pin engaging a shutter cam slot formed in the shutter, a second cam pin engaging a blade cam slot formed in the blade member, and a third cam pin engaging a cam hole formed in a bottom plate.

4. The air register of claim 3, wherein the shutter includes an upper arm, a lower arm opposite the upper arm, and a blocking wall extending between the upper arm and the lower arm, the blocking wall overlapping the rear opening formed in the blade member.

5. The air register of claim 4, wherein an upper shutter aperture is formed in the upper arm for engaging an upper pivot boss of the blade member, and a lower shutter aperture is formed in the lower arm for engaging a lower pivot boss of the blade member, the shutter rotatable relative to the blade member about the upper pivot boss and the lower pivot boss.

6. The air register of claim 5, wherein the shutter cam slot is formed in the lower arm adjacent the lower shutter aperture.

7. The air register of claim 6, wherein the blade cam slot is formed in a bottom wall of the blade member, the blade cam slot includes an arcuate blade cam slot portion and a linear blade cam slot portion extending from the arcuate blade cam slot portion.

8. The air register of claim 7, wherein the second cam pin remains in the linear blade cam slot portion as the blade member rotates in a rotation direction from the open position.

9. The air register of claim 8, wherein the second cam pin remains in the arcuate blade cam slot portion as the blade member rotates in a counter-rotation direction from the open position, the counter-rotation direction is opposite the rotation direction.

10. The air register of claim 2, wherein movement of the push knob in a first direction to position the air register in the closed position from the open position rotates the blade member a first distance in a rotation direction and rotates the shutter a second distance in the rotation direction greater than the first distance.

11. A vehicle comprising:
a dashboard; and
an air register provided within the dashboard, the air register comprising:
a housing fixed to the dashboard;
a blade member rotatably coupled to the housing, the blade member including a plurality of vertical blades and a side wall defining a rear opening; and
a shutter rotatably coupled to the blade member such that, when the air register is in an open position, air is permitted to enter the blade member through the rear opening and flow between the plurality of vertical blades, and when the air register is in a closed position, the shutter is rotated relative to the blade member to inhibit air from entering the blade member through the rear opening.

12. The vehicle of claim 11, further comprising:
a cam member including a first cam pin engaging a shutter cam slot formed in the shutter, a second cam pin engaging a blade cam slot formed in the blade member, and a third cam pin engaging a cam hole formed in a bottom plate,
wherein the blade cam slot includes an arcuate blade cam slot portion and a linear blade cam slot portion extending from the arcuate blade cam slot portion.

13. The vehicle of claim 12, wherein the second cam pin remains in the linear blade cam slot portion as the blade member rotates in a rotation direction from the open position.

14. The vehicle of claim 13, wherein the second cam pin remains in the arcuate blade cam slot portion as the blade member rotates in a counter-rotation direction from the open position, the counter-rotation direction is opposite the rotation direction.

15. The vehicle of claim 12, further comprising a push knob rotatably coupled to one of the plurality of vertical blades of the blade member, wherein movement of the push knob in a first direction to position the air register in the closed position from the open position rotates the blade member a first distance in a rotation direction and rotates the shutter a second distance in the rotation direction greater than the first distance.

16. A method of operating an air register comprising a blade member including a plurality of vertical blades and a side wall defining a rear opening, and a shutter rotatably coupled to the blade member, the method comprising:
rotating the blade member in a rotation direction from an open position in which the shutter permits air to enter the blade member through the rear opening and flow between the plurality of vertical blades; and
automatically rotating the shutter to inhibit air from entering the blade member through the rear opening in response to the blade member rotating in the rotation direction from the open position to a closed in response to the blade member rotating in the rotation direction from the open position to a closed position.

17. The method of claim 16, further comprising:
rotating the blade member in a counter-rotation direction from the open position, the counter-rotation direction being opposite the rotation direction,
maintaining the shutter in a fixed position relative to a housing in which the blade member is provided during rotation of the blade member in the counter-rotation direction.

18. The method of claim 17, further comprising positioning a cam member between the blade member and a bottom plate, the cam member including a first cam pin engaging a shutter cam slot formed in the shutter, a second cam pin engaging a blade cam slot formed in the blade member, and a third cam pin engaging a cam hole formed in the bottom plate.

19. The method of claim 18, wherein:
the blade cam slot includes an arcuate blade cam slot portion and a linear blade cam slot portion extending from the arcuate blade cam slot portion;
the second cam pin remains in the linear blade cam slot portion as the blade member rotates in the rotation direction from the open position; and
the second cam pin remains in the arcuate blade cam slot portion as the blade member rotates in the counter-rotation direction from the open position.

* * * * *